US00RE45961E

(19) United States
(12) Reissued Patent
Walter

(10) Patent Number: US RE45,961 E
(45) Date of Reissued Patent: Apr. 5, 2016

(54) CART BASKET

(71) Applicant: AMSA, Inc., Boulder, CO (US)

(72) Inventor: Ivor Michel Walter, Boulder, CO (US)

(73) Assignee: ASMA, Inc., Boulder, CO (US)

(21) Appl. No.: 29/486,266

(22) Filed: Mar. 27, 2014

Related U.S. Patent Documents

Reissue of:
(64) Patent No.: Des. 656,700
Issued: Mar. 27, 2012
Appl. No.: 29/388,157
Filed: Mar. 24, 2011

(51) LOC (10) Cl. ..... 12-02
(52) U.S. Cl.
USPC ..... D34/27
(58) Field of Classification Search
USPC ..... D34/12–27; 280/33.992, 33.991, 280/33.993, 47.34, 79.11; 220/334
See application file for complete search history.

(56) References Cited

U.S. PATENT DOCUMENTS 3,039,564 A 6/1962 Shaukis
D247,953 S * 5/1978 Rehrig ..... D34/27

(Continued)

OTHER PUBLICATIONS

Technibilt 5141-D Scan of website [http://www.technibilt.com/carts/detail.php?id=36]showing prior art cart manufactured by Technibilt. Cart shown is admitted prior art to current design by Applicant.

(Continued)

*Primary Examiner* — Phillip S Hyder

(74) *Attorney, Agent, or Firm* — Polson Intellectual Property Law, PC; Margaret Polson

(57) CLAIM

The ornamental design for a [set of] cart basket[s], as shown and described.

DESCRIPTION

FIG. 1 is a front perspective view of the first embodiment for a [set of] cart [baskets] *basket* showing my new design.
FIG. 2 is a side elevation view of the right and left sides, which are mirror images, of FIG. 1.
FIG. 3 is a front side elevation view of FIG. 1.
FIG. 4 is back side elevation view of FIG. 1.
FIG. 5 is a top plan view of FIG. 1.
FIG. 6 is a bottom plan view of FIG. 1.
FIG. 7 is a front perspective view of the second embodiment for a [set of] cart [baskets] *basket* showing my new design.
FIG. 8 is a side elevation view of the right and left sides, which are mirror images, of FIG. 7.
FIG. 9 is a front side elevation view of FIG. 7.
FIG. 10 is back side elevation view of FIG. 7.
FIG. 11 is a top plan view of FIG. 7.
FIG. 12 is a bottom plan view of FIG. 7.
FIG. 13 is a front perspective view of the third embodiment for a [set of] cart [baskets] *basket* showing my new design;
FIG. 14 is a side elevation view of the right and left sides, which are mirror images, of FIG. 13.
FIG. 15 is a front side elevation view of FIG. 13.
FIG. 16 is back side elevation view of FIG. 13.
FIG. 17 is a top plan view of FIG. 13; and,
FIG. 18 is a bottom plan view of FIG. 13.
The broken line showing of the frame, logo panel *bottom of the baskets,* and back gates is included for the purpose of illustrating elements of the cart and forms no part of the claimed design.

1 Claim, 18 Drawing Sheets

Figure 1:
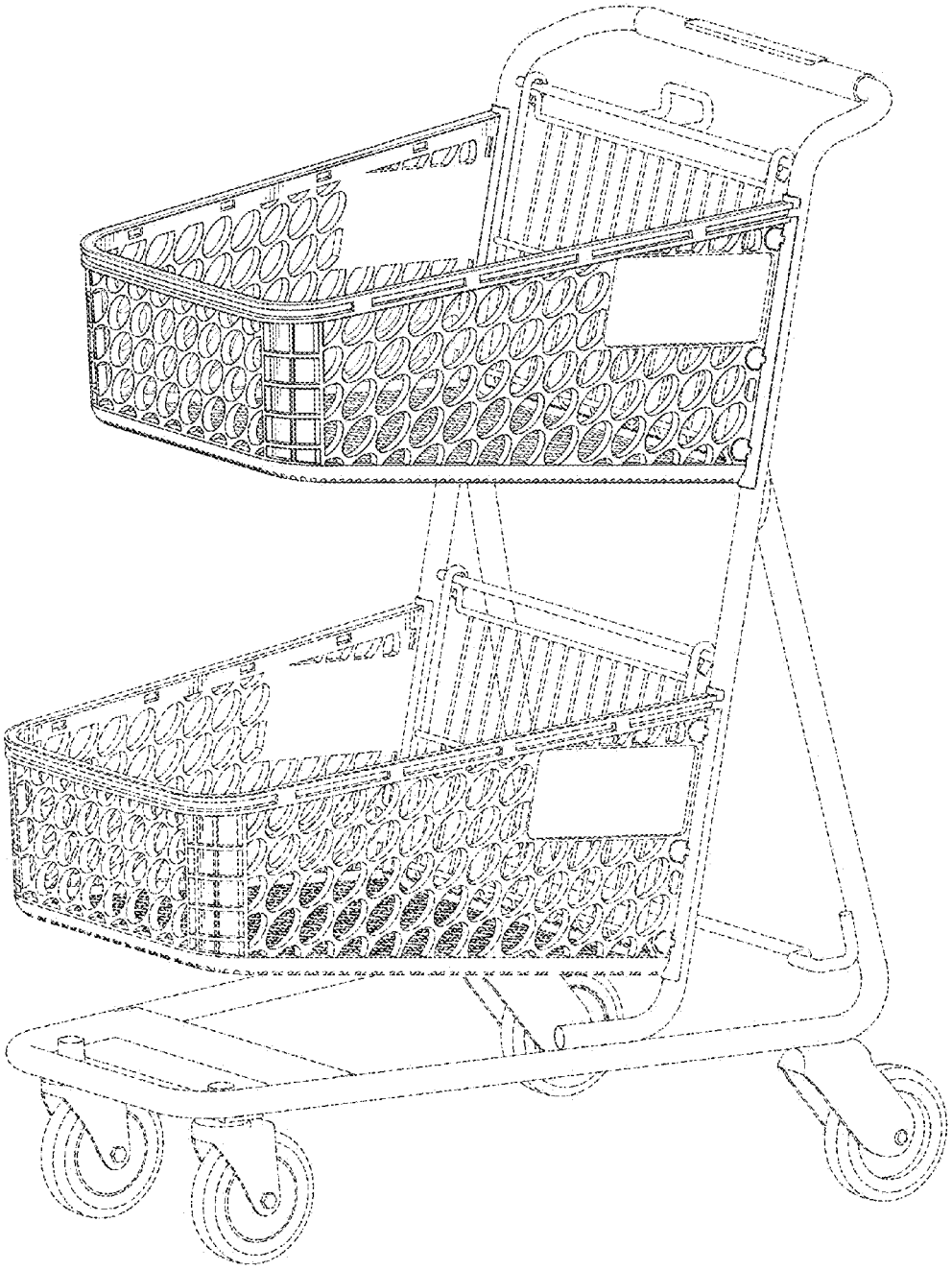
Figure 2:
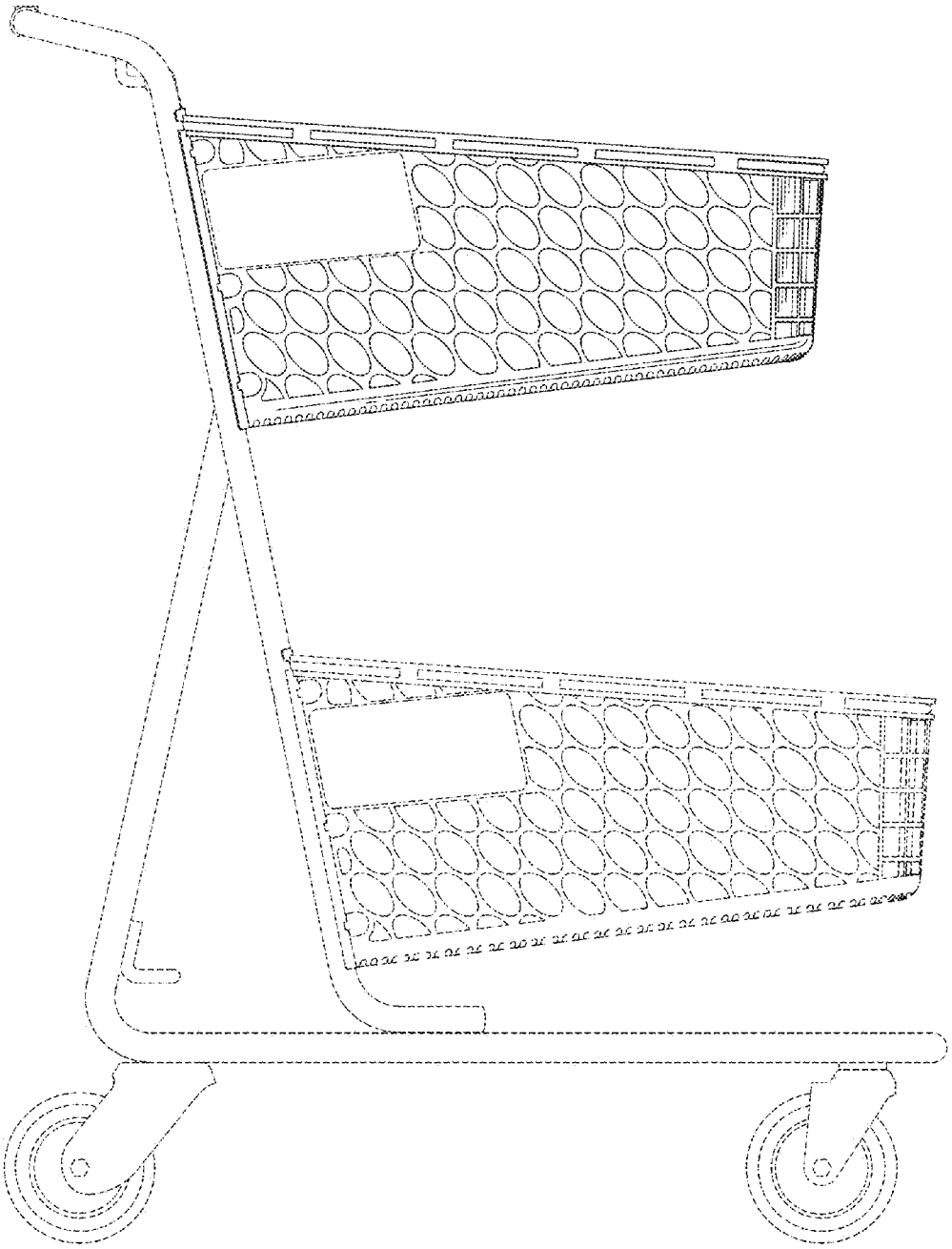
Figure 3:
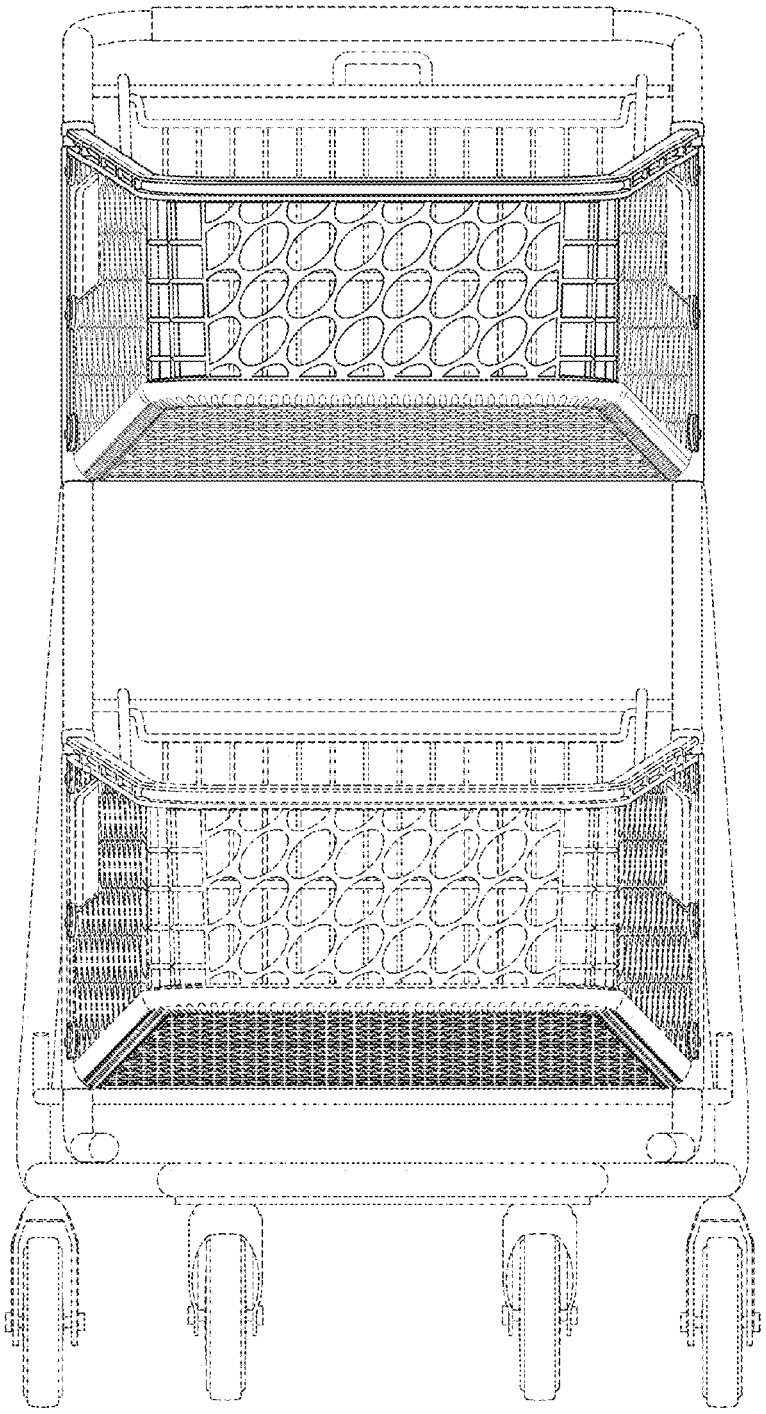
Figure 4:
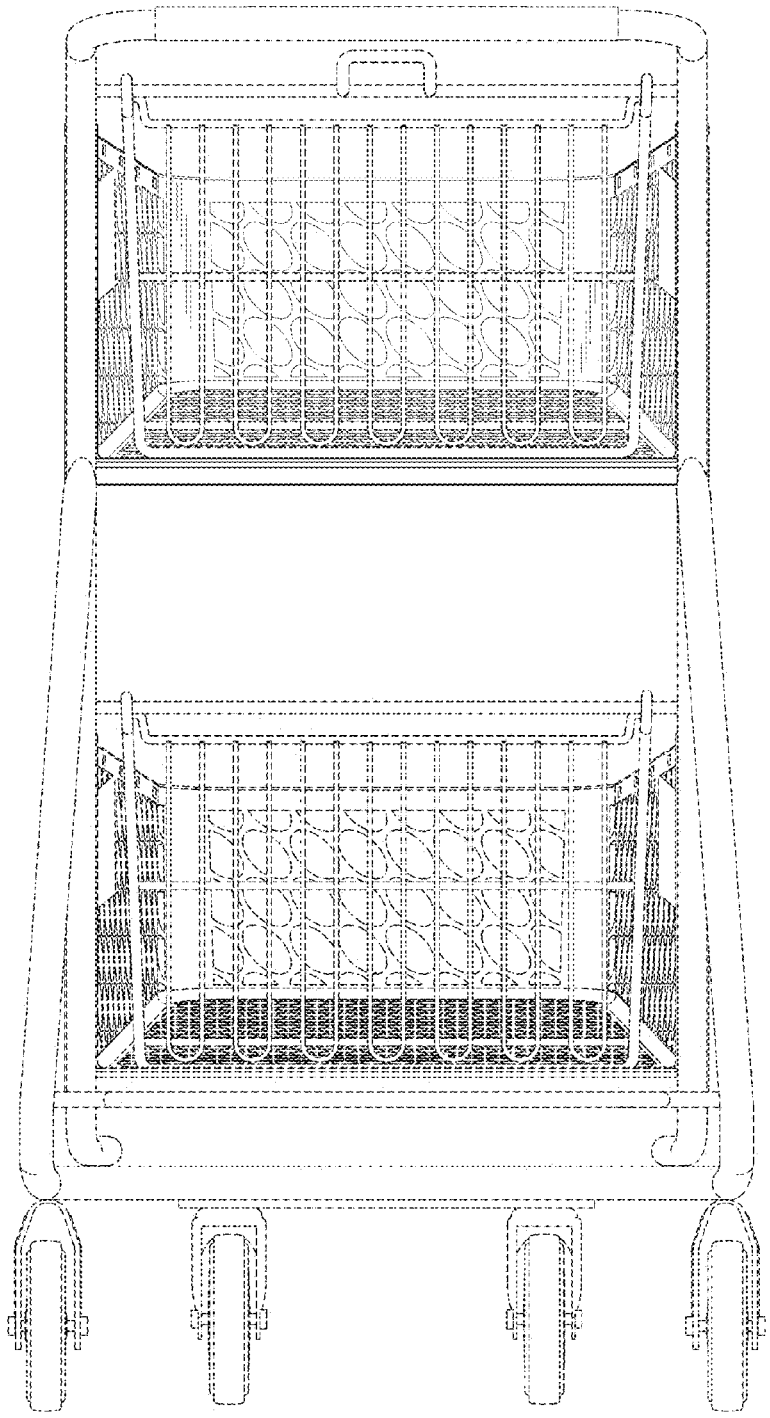
Figure 5:
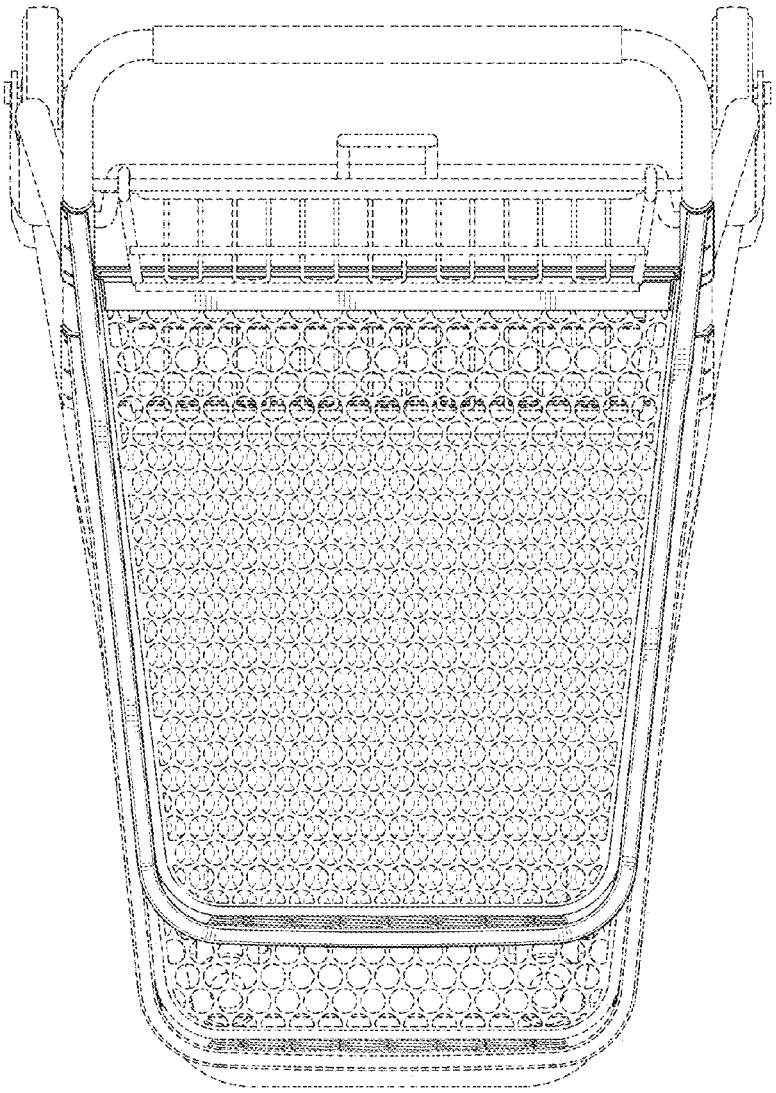
Figure 6:
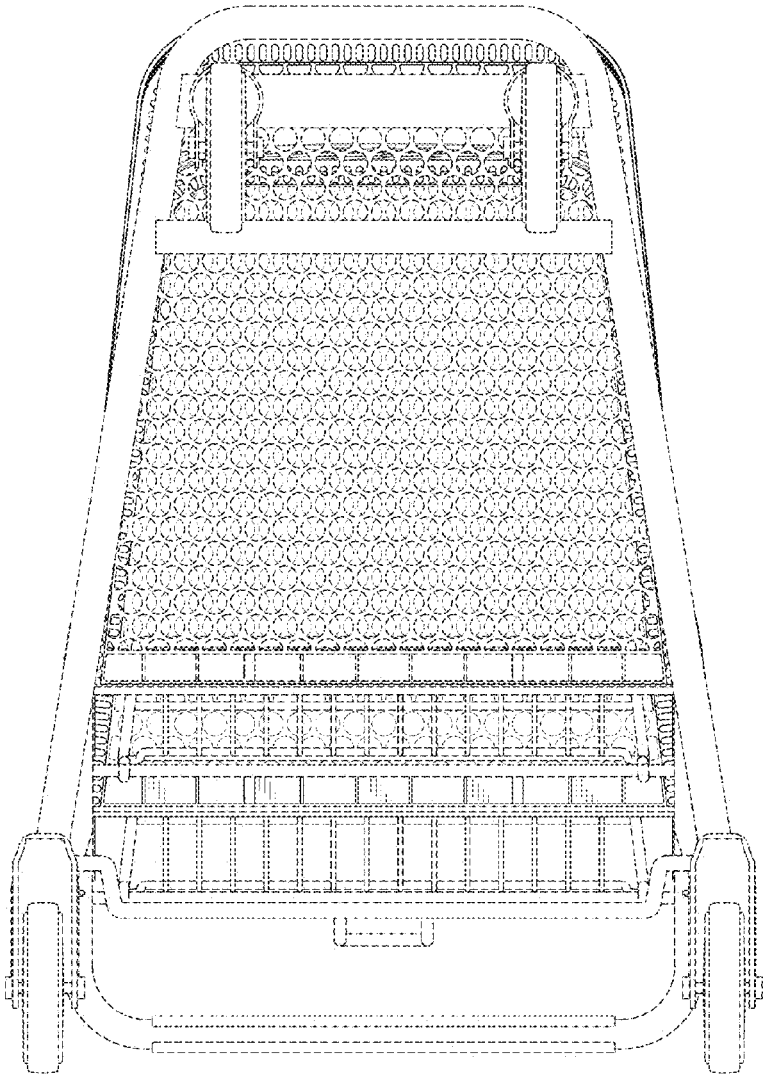
Figure 7:
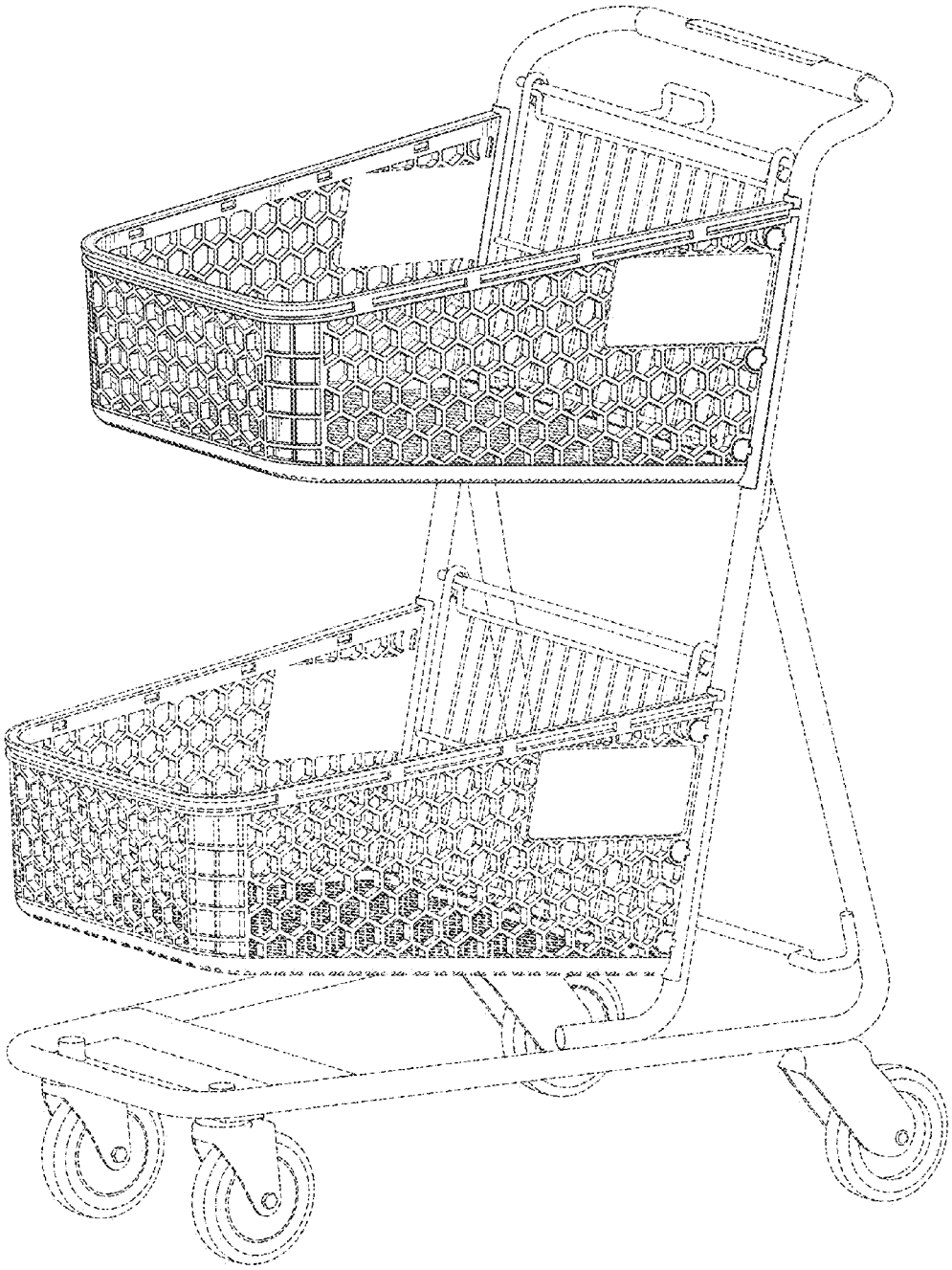
Figure 8:
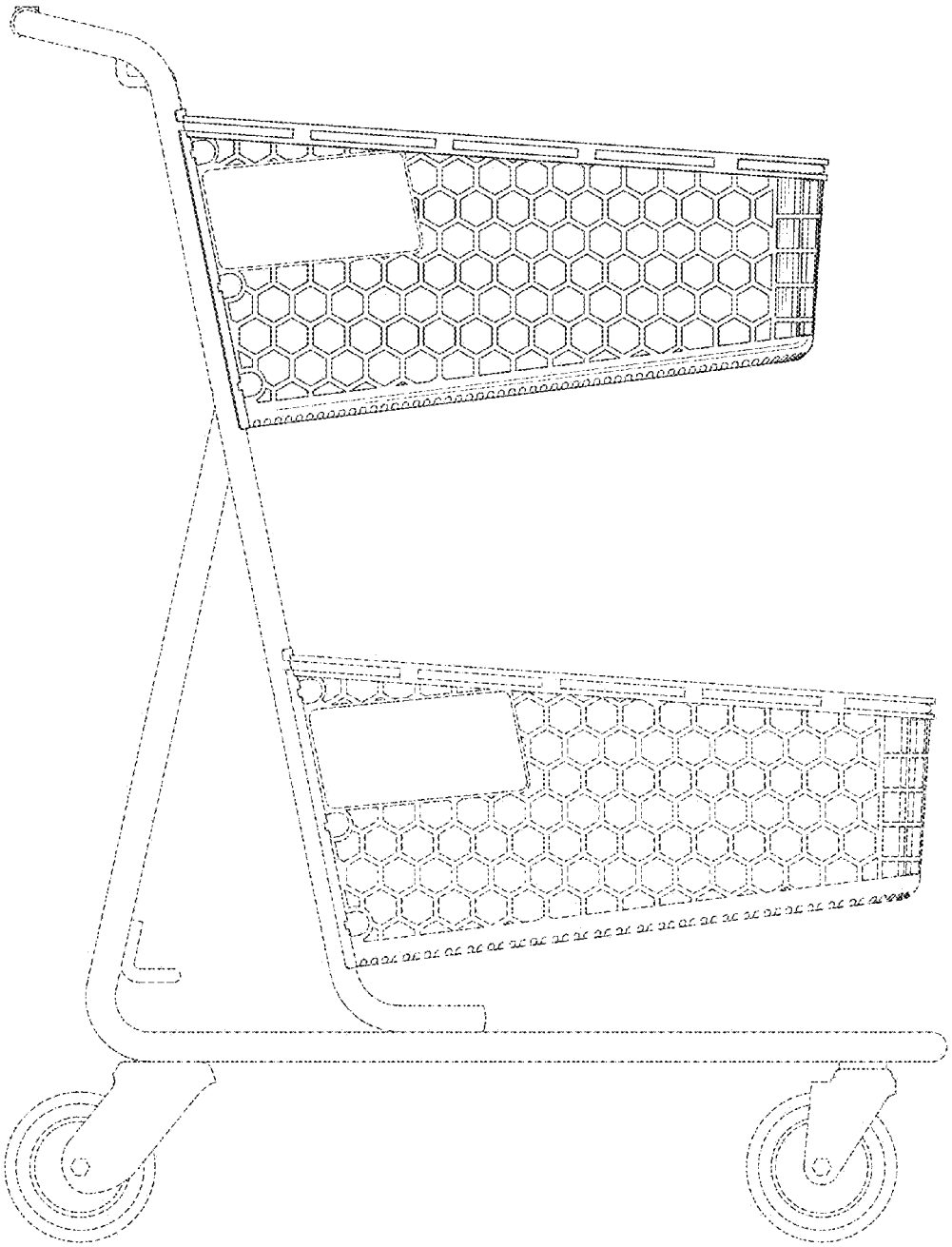
Figure 9:
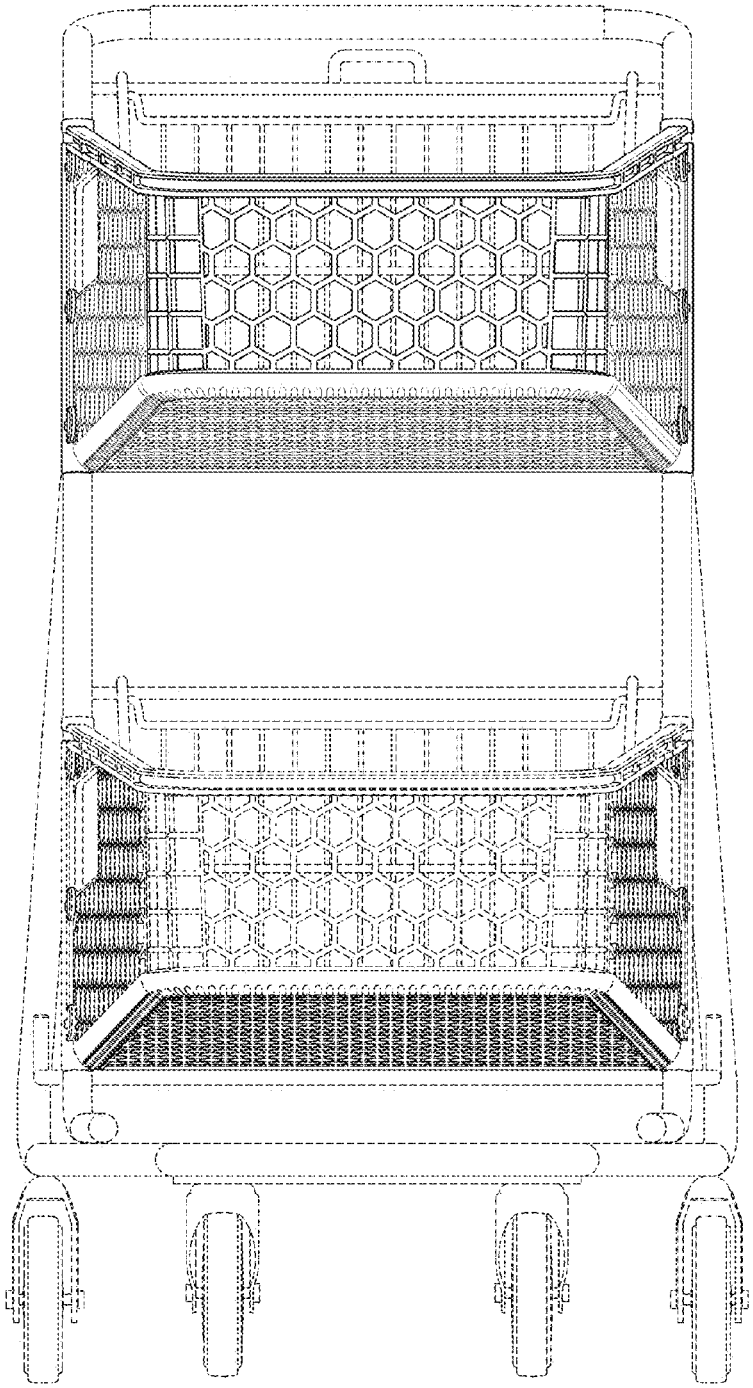
Figure 10:
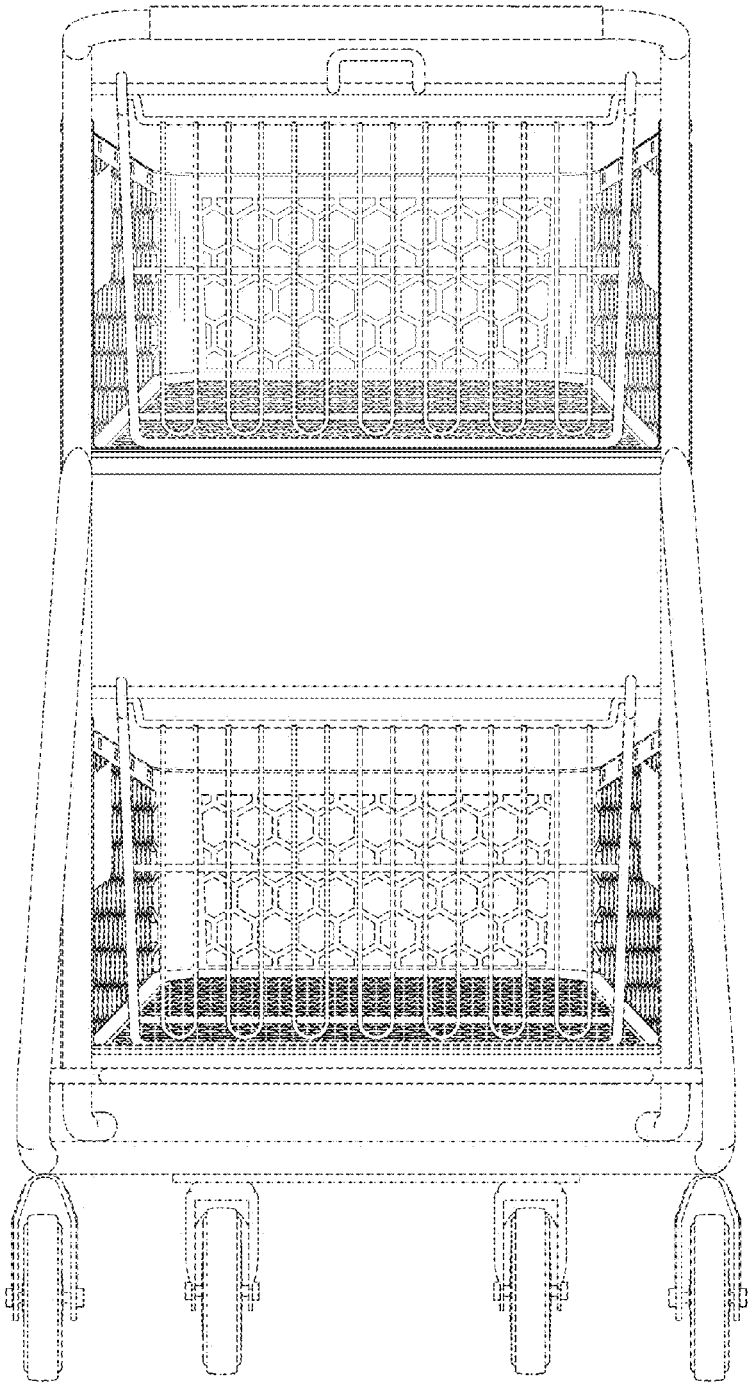
Figure 11:
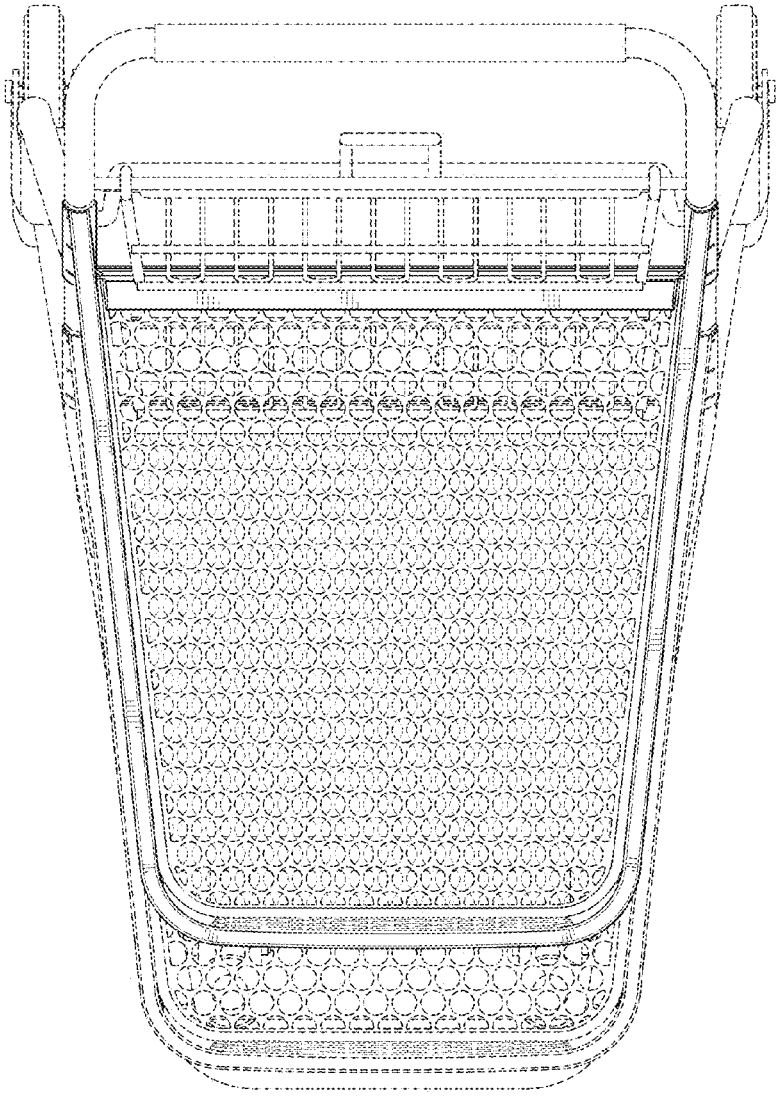
Figure 12:
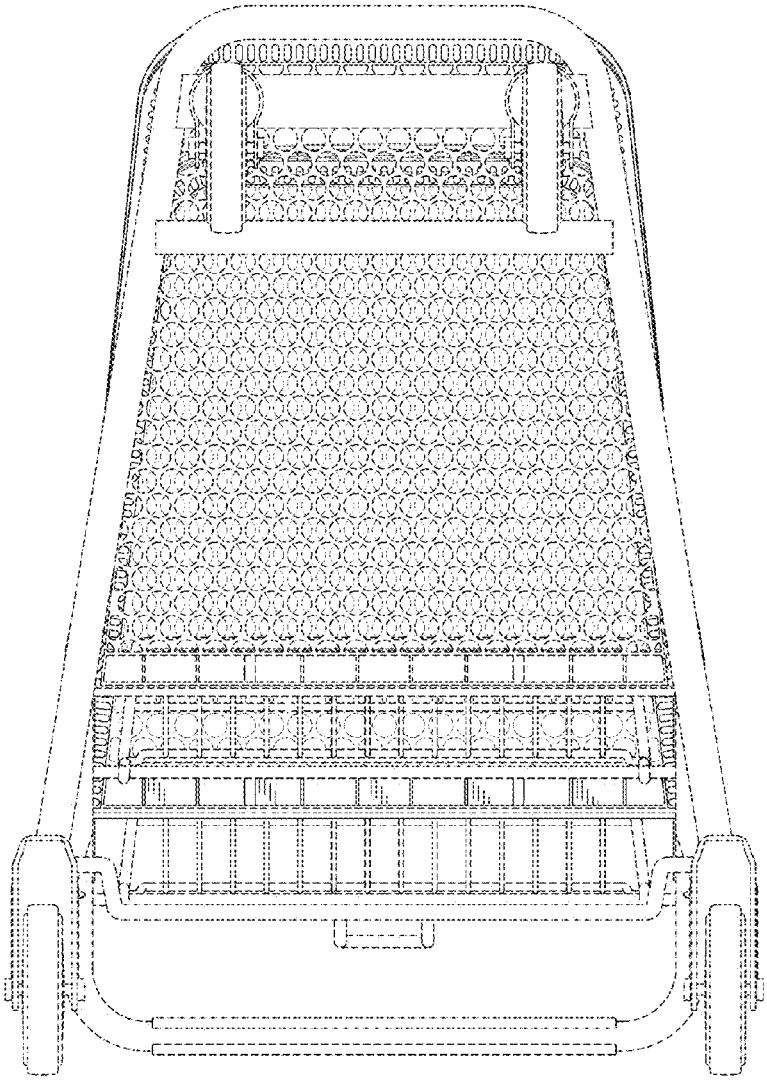
Figure 13:
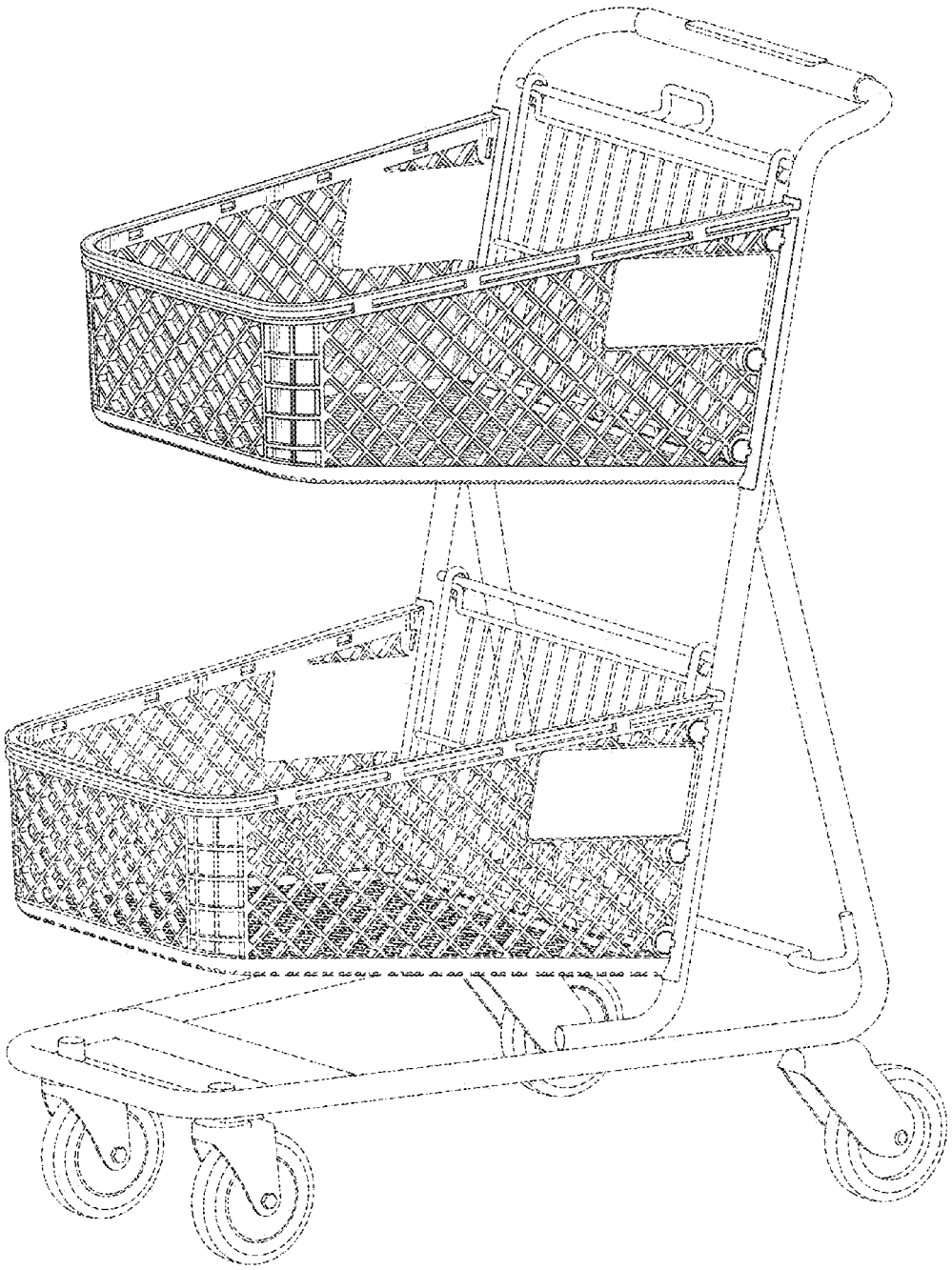
Figure 14:
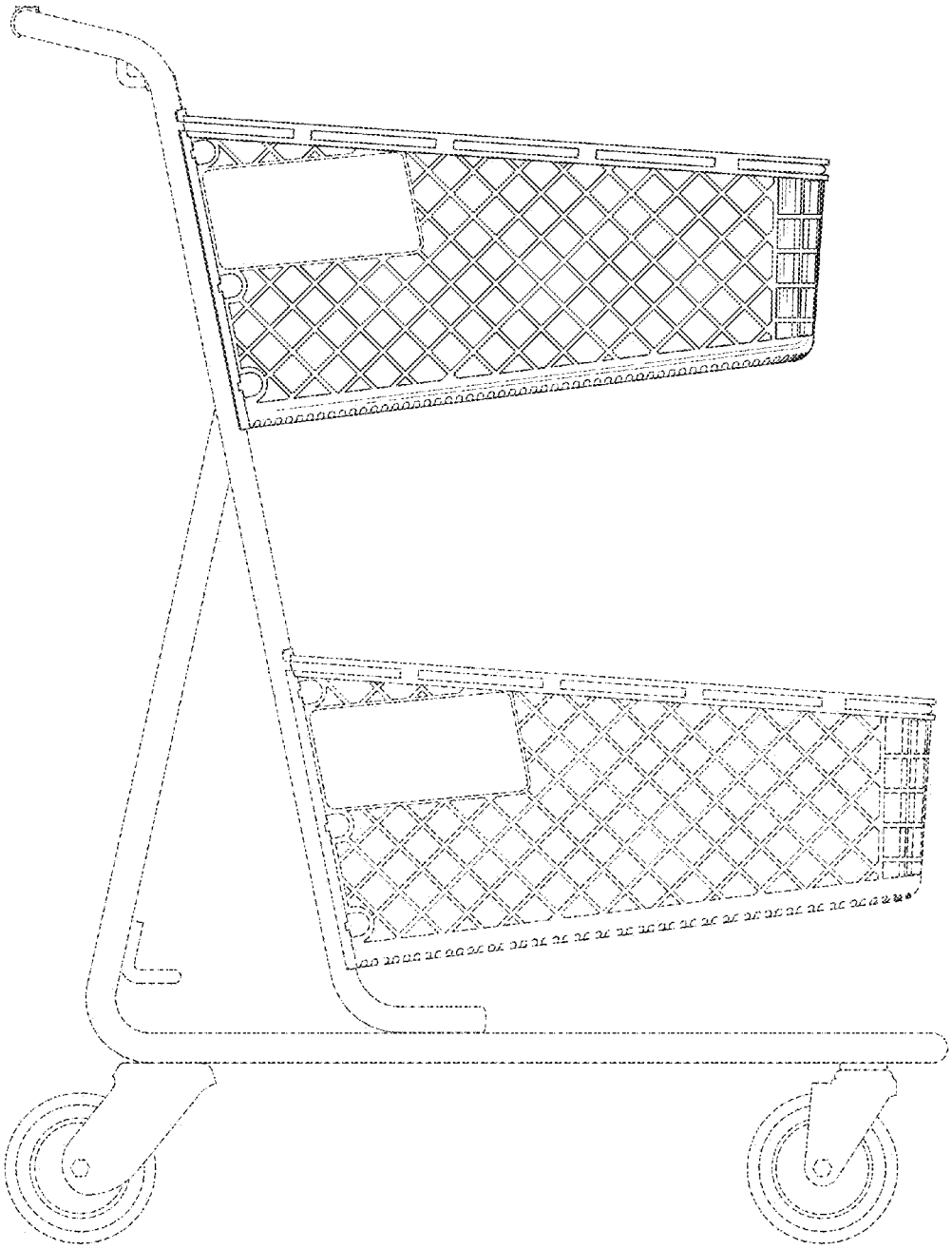
Figure 15:
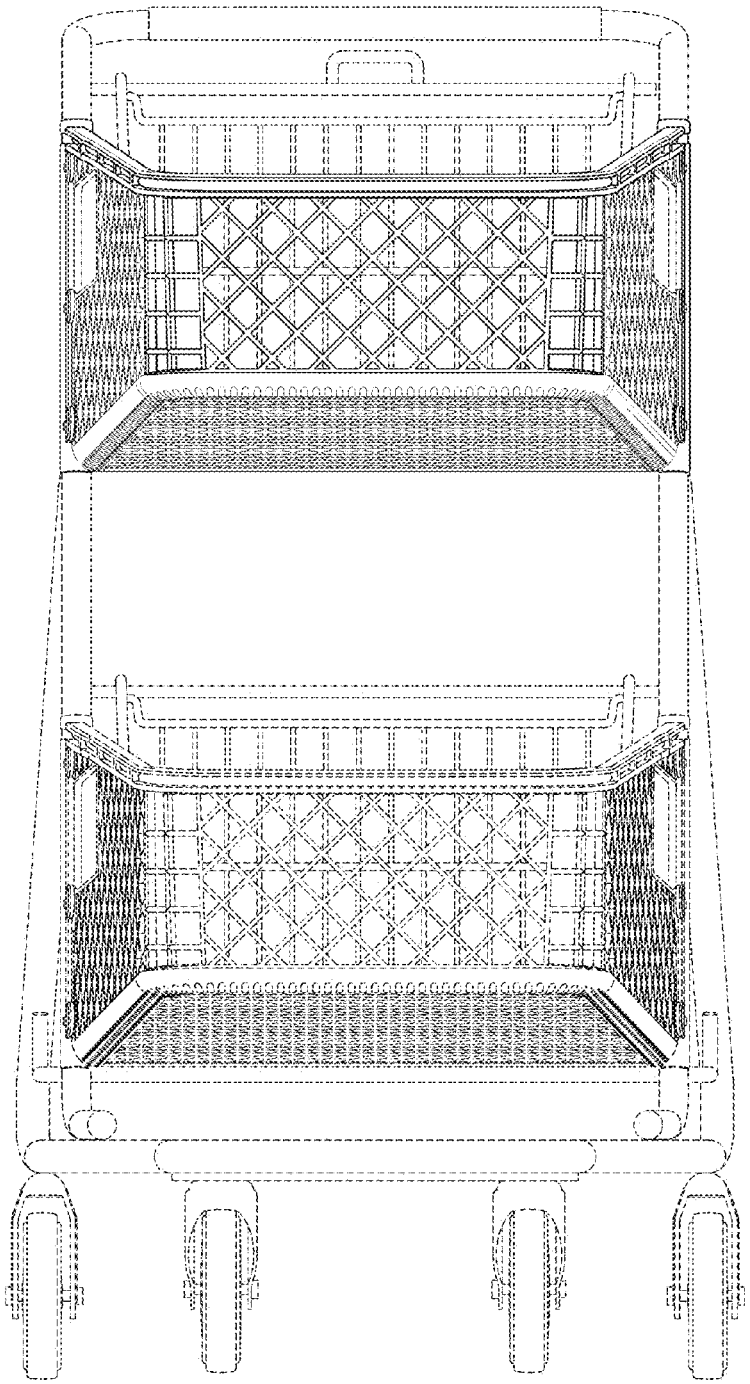
Figure 16:
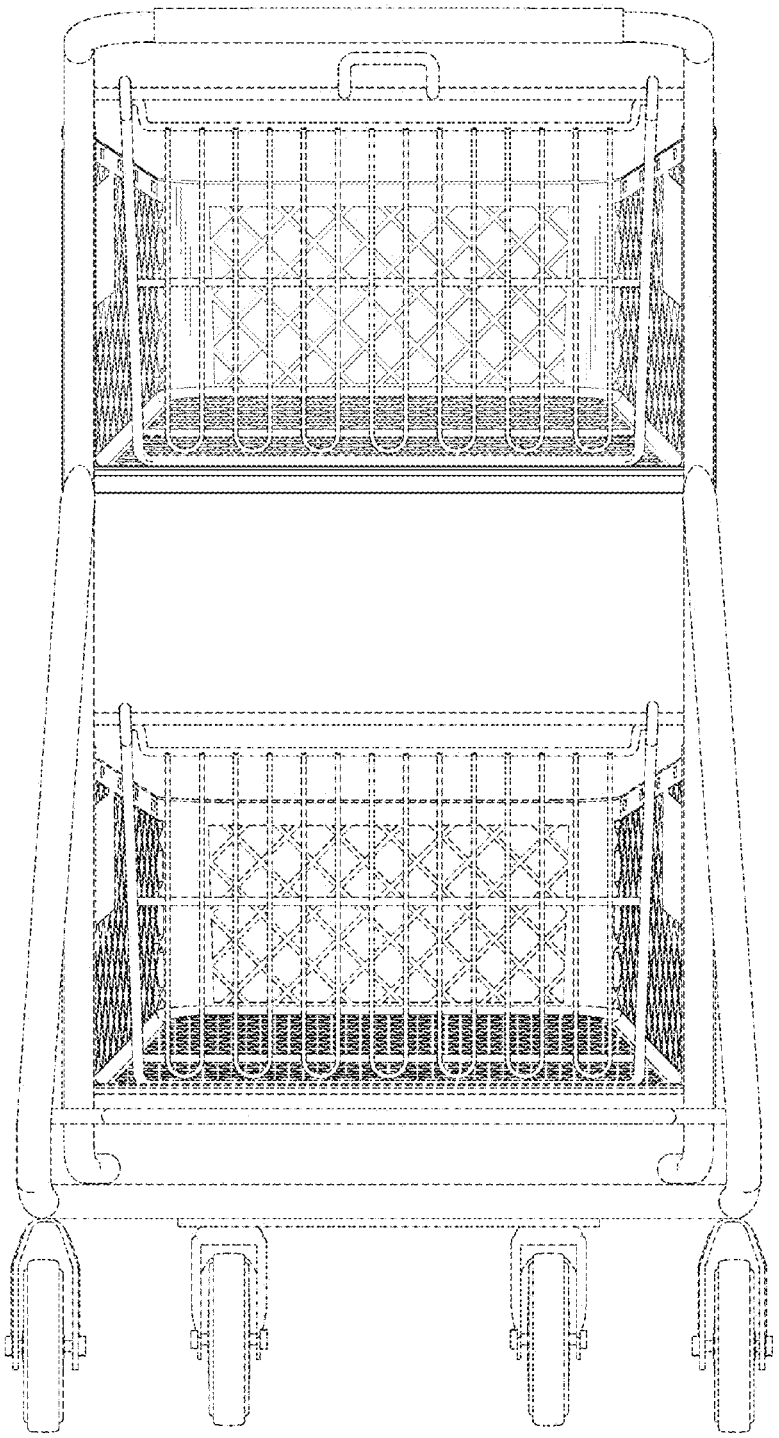
Figure 17:
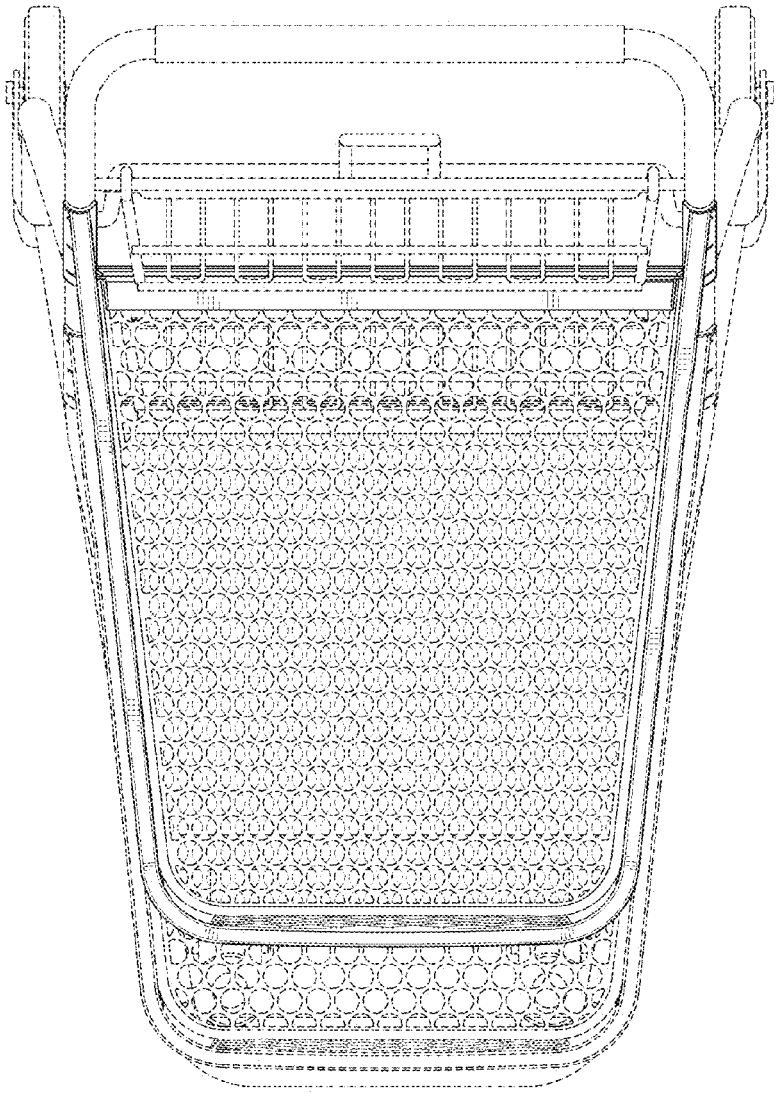
Figure 18:
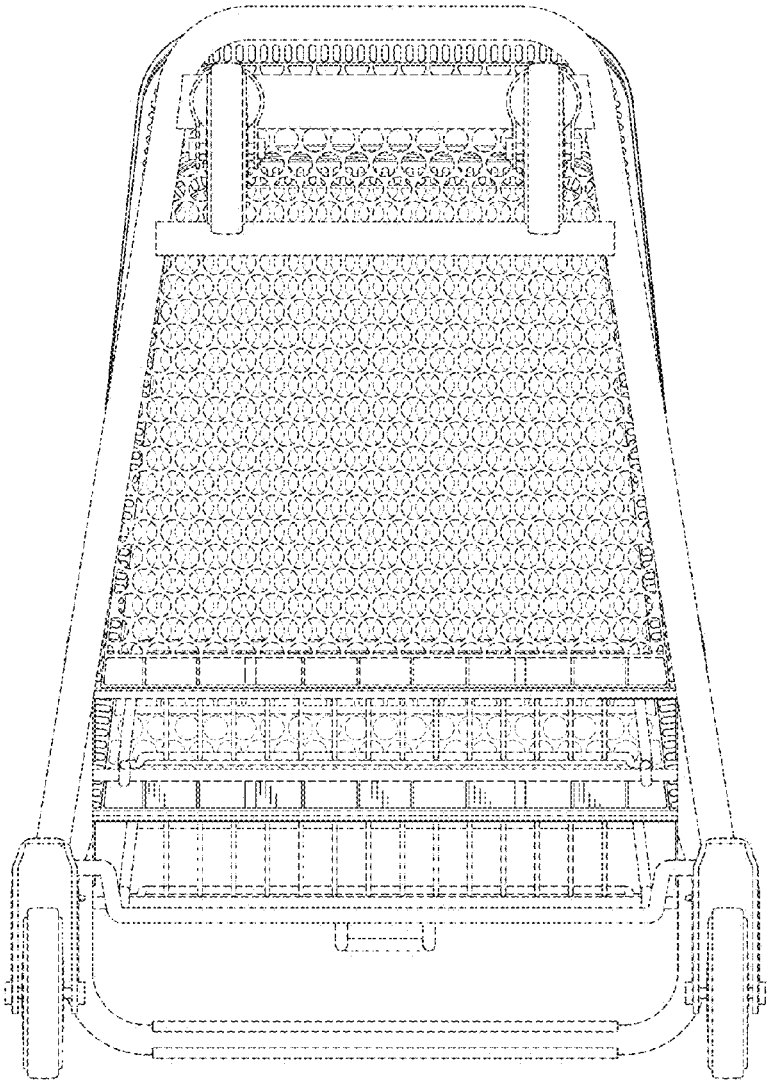

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| 4,632,411 | A | | 12/1986 | Badger | |
| 4,650,199 | A | * | 3/1987 | Rehrig | 280/33.997 |
| D294,419 | S | | 2/1988 | Rehrig | |
| D296,259 | S | * | 6/1988 | Rehrig | D34/27 |
| D317,219 | S | * | 5/1991 | Rehrig | D34/27 |
| D346,473 | S | | 4/1994 | Hubble | |
| D400,679 | S | * | 11/1998 | Kern et al. | D34/27 |
| 5,865,448 | A | * | 2/1999 | Kern et al. | 280/33.992 |
| D412,046 | S | | 7/1999 | Rehrig et al. | |
| 5,947,313 | A | * | 9/1999 | Kern et al. | 220/4.01 |
| D426,365 | S | | 6/2000 | Rehrig et al. | |
| 6,126,181 | A | | 10/2000 | Ondrasik | |
| 6,533,297 | B2 | | 3/2003 | Saccani | |
| 6,644,674 | B2 | | 11/2003 | Simard | |
| 6,676,139 | B1 | | 1/2004 | Saccani | |
| 6,932,363 | B2 | | 8/2005 | D'Angelo | |
| 6,981,708 | B1 | | 1/2006 | Tucker et al. | 280/33.992 |
| D528,732 | S | | 9/2006 | Hubbard et al. | D34/27 |
| D538,501 | S | | 3/2007 | Walter | |
| D550,423 | S | * | 9/2007 | Splain et al. | D34/12 |
| D556,413 | S | * | 11/2007 | Splain et al. | D34/12 |
| D564,172 | S | * | 3/2008 | Steinhobel | D34/12 |
| D580,619 | S | | 11/2008 | Walter | |
| D583,523 | S | | 12/2008 | Deal et al. | |
| D607,173 | S | | 12/2009 | Selvig et al. | |
| D628,759 | S | | 12/2010 | Walter | |
| D633,269 | S | | 2/2011 | Walter | |
| D638,602 | S | | 5/2011 | Walter | |
| D644,809 | S | | 9/2011 | Walter | |
| D645,222 | S | | 9/2011 | Walter | |
| D651,655 | S | | 1/2012 | Walter | |
| D656,288 | S | | 3/2012 | Walter | |
| D656,700 | S | | 3/2012 | Walter | |
| 2001/0022436 | A1 | | 9/2001 | Simard | |
| 2003/0151219 | A1 | | 8/2003 | Simard | |

OTHER PUBLICATIONS

Technibilt 5341 Scan of website [http://www.technibilt.com/carts/detail.php?id=30] showing prior art cart manufactured by Technibilt. Cart shown is admitted prior art to current design by Applicant.

Technibilt 5640 Scan of website [http://www.technibilt.com/carts/detail.php?id=28] showing prior art cart manufactured by Technibilt. Cart shown is admitted prior art to current design by Applicant.

Unarco PC-41 U Scan of website [http://unarco.com/PC41 U.pdf] showing prior art cart manufactured by Unarco. Cart shown is admitted prior art to current design by Applicant.

Wanzl Tango Scan of website [http://wanzl.com/OOO/En/Home/Products/Self-Service_systems/Shopping_Trolleys/Shopping_Trolley_Series/Tango.html] showing prior art cart manufactured by Wanzl. Cart shown is admitted prior art to current design by Applicant.

First Amended Complaint and Jury Demand filed by *AMSA, Inc. dba Versacart, Inc.* v. *The Peggs Company, Inc.*, US District Court, District of Colorado, filed Apr. 18, 2014, for infringement of parent U.S. Pat. No. D656,700 and others. 46 pages.

Answer, Affirmative Defenses and Counterclaims to First Amended Complaint and Jury Demand filed by *AMSA, Inc. dba Versacart, Inc.* v. *The Peggs Company, Inc.*, US District Court, District of Colorado, filed May 9, 2014. 18 pages.

Plaintiff's Answer to Defendant's nswer, Affirmative Defenses and Counterclaims to First Amended Complaint and Jury Demand filed by *AMSA, Inc. dba Versacart, Inc.* v. *The Peggs Company, Inc.*, US District Court, District of Colorado, filed May 21, 2014.9 pages.

Peggs KNM075GT Scan of website [http://www.thepeggscompany.com/shopping_carts/large_view/2_tier.html] showing prior art cart manufactured by Peggs.

Plasti-Cart Max 200 Scan of website [http://www.plasti-cart.com/upload/assets/AllPlasticMax200.pdf] showing prior art cart manufactured by Plasti-Cart.

Supercart neXus Scan of website [http://supercart.com/data/products/627854469nexus.pdf] showing prior art cart manufactured by Supercart.

Supercart XL 200 Scan of website [http://supercart.com/data/products/1388572286xlcarrie(xl200).pdf] showing prior art cart manufactured by Supercart.

U.S. Appl. No. 29/334,767, filed Apr. 1, 2009; Inventor: Ivor Michel Walter.

U.S. Appl. No. 29/380,209, filed Dec. 1, 2010; Inventor: Ivor Michel Walter.

U.S. Appl. No. 29/380,622, filed Dec. 8, 2010; Inventor: Ivor Michel Walter.

U.S. Appl. No. 29/388,081, filed Mar. 23, 2011; Inventor: Ivor Michel Walter.

* cited by examiner